Nov. 4, 1952 W. C. GRAHLING ET AL 2,616,659
POPPET VALVE MOUNTING ASSEMBLY
Filed Oct. 14, 1950

INVENTORS
WALTER C. GRAHLING
& THEODORE A. ST. CLAIR.
BY Richey & Watts
ATTORNEYS Patented Nov. 4, 1952

2,616,659

UNITED STATES PATENT OFFICE 2,616,659

POPPET VALVE MOUNTING ASSEMBLY

Walter C. Grahling, East Cleveland, and Theodore A. St. Clair, South Euclid, Ohio, assignors to The Weatherhead Company, Cleveland, Ohio, a corporation of Ohio Application October 14, 1950, Serial No. 190,080

10 Claims. (Cl. 251—133)

This invention relates to poppet valve mounting assemblies in general, and is particularly adapted to poppet valve mounting assemblies employed in fluid pressure regulators or the like.

A principal object of the invention resides in simplifying the construction and assembly of a pivoted poppet valve in general, and more specifically, a valve of the type employed in fluid pressure regulators. Such valves normally embody a construction wherein the closure or valve member is slidably mounted in a bore for motion toward and away from a valve seat in the bore. The member is actuated by a bell crank lever assembly pivoted to the valve member at one zone and to the body of the assembly at another zone, and having an extension for engaging an actuating diaphragm or other operating device.

The aforesaid advantages of economy of construction and simplicity in assembly are attained in a preferred embodiment of the invention by providing a quick attachable and detachable mounting in the form of a pivoted lever having opposed ears and mounted on the valve member. One of the ears pivots in an external or internal groove in the valve body and the other slides through a slot intersecting the groove, which arrangement facilitates almost instant assembly and disassembly of the parts by a bayonet-type of action and without the use of tools.

Another object of the invention resides in reduction of the weight of the moving valve parts which, in some applications such as pressure regulators, improves the sensitivity of the regulators. Such weight reduction is a characteristic of the type of assembly just referred to as the preferred embodiment of the invention.

The manner in which these and other objects are accomplished will be apparent from the following detailed description of a preferred embodiment of the invention.

Figure 1:
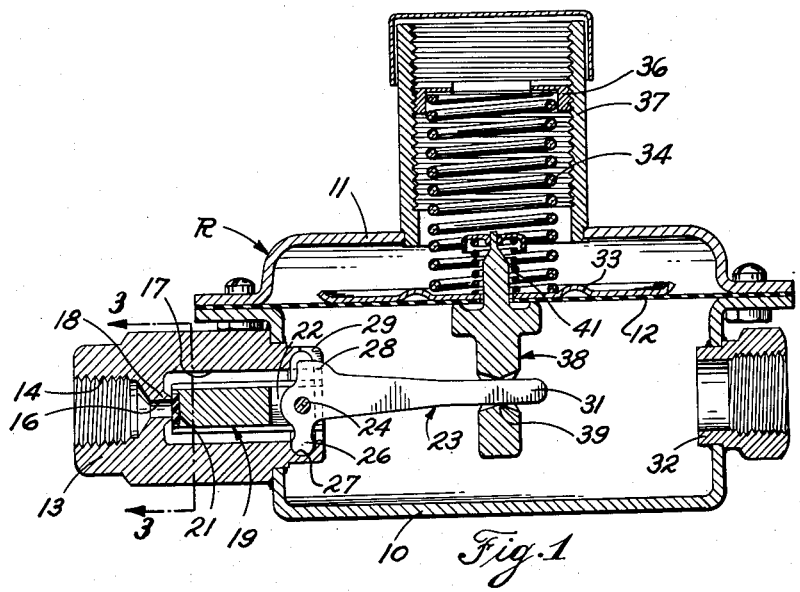
Fig. 1 is a vertical section through a complete regulator assembled in accordance with the invention.
Figure 2:
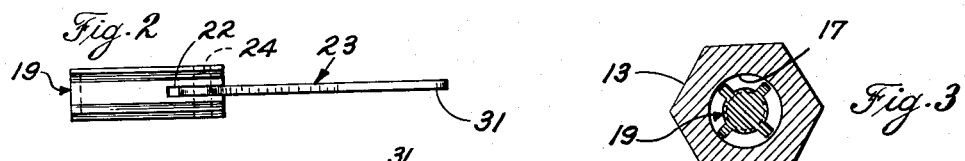
Fig. 2 is a top view of the valve member and lever unit.
Figure 3:
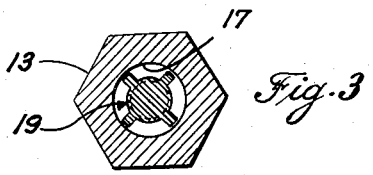
Fig. 3 is a section taken on 3—3 of Fig. 1.

As seen in Fig. 1 the invention is shown installed in a fluid pressure regulator R having a main housing member 10 and a bonnet or cap member 11 formed of sheet metal. A diaphragm 12 is clamped between these members forming the usual pressure or regulating chamber and the protected atmosphere chamber. Brazed or otherwise fastened to member 10 is a body or nipple member 13, which has a bore therethrough for conduction of fluid into the pressure chamber. This bore is formed with a threaded portion 14 for receiving a fitting, a restricted nozzle 16, and an enlarged bore portion 17 for receiving the valve member. A valve seat 18 is formed within the bore 17. Slidable in bore 17 is a non-circular closure or valve member 19, which is arranged to permit fluid to flow past the member when the valve is opened. A relatively soft sealing member 21 is carried by the valve member for making sealing engagement with the valve seat 18.

In order to accomplish the purposes of the invention, novel and simple mounting and actuating means for the valve member 19 are provided. The valve member is slotted as at 22 for reception of a thin lever member 23 pivoted to the valve member by a pin 24. In the assembled position it can be seen that a curved projection or ear 26 is formed on the lever 23 which fits within a semi-torroidal groove 27 formed in the member 13, and opening radially inwardly into the bore 17. Rotation of the valve member and lever about the axis of the valve member is prevented by a diametrically-opposed ear or projection 28 which slides within a slot 29 formed in the valve body and intersecting the radial groove 27. Slot 29 is substantially equal in width to the thickness of ear 28. The manner of assembly of these parts will be explained in detail presently.

In the illustrated embodiment of the invention, the lever 23 has an extension 31 for actuation by the regulator structure. As is usual an outlet port 32 is provided in the member 10. The actuating structure includes a backing plate 33 for protecting the diaphragm 12, the diaphragm being urged in a direction to open the valve by means of a spring 34 engaging a spring base 36 adjustably mounted in a spring housing 37 attached to cover plate 11. A post 38 is mounted for motion with the diaphragm and serves to connect the latter to the valve actuating lever 23 by means of a knife-edge construction 39 engaging the lever extension 31. The spring 41 and associated structure shown in Fig. 1 is a pressure relief valve assembly, well-known in the art, and forming no part of the invention.

Figure 4:
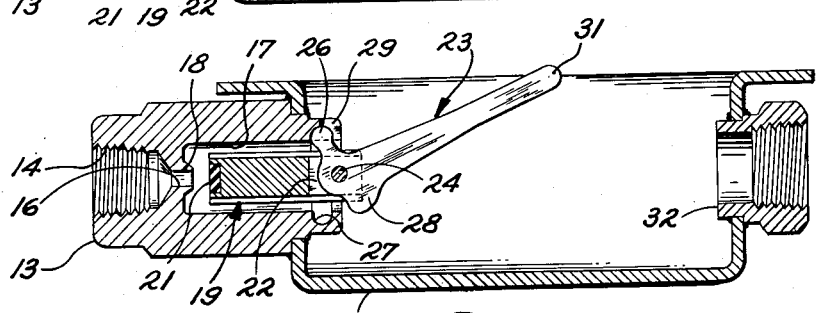
Fig. 4 is a partial section of the regulator showing an initial stage in the assembly of the valve member therewith; and, Fig. 5 is a partial section showing a modified form of the invention.

Referring to Fig. 4, an initial stage in the assembly of the poppet valve and lever is illustrated.

Before the cover plate 11 and the diaphragm are fitted to the valve, the poppet valve lever is gripped and the valve member 19 slid into the bore 17. The lever is turned upside down from its final position so that the curved or pivot-forming ear 26 may enter the slot 29 to bring the ear within the envelope of the inward groove 27.

At this time the inner edge of projection 28 bears against the outer end of the member 13 and prevents the shank 31 of the lever 23 from assuming its normal position, that is the position wherein it is substantially aligned with the axis of the valve member 19. However, by rotating the lever 23 through an arc of 180°, projection 28 is quickly aligned with slot 29 whereupon the lever can be moved so that it assumes its normal position which, in the preferred construction, is substantially within the axis of the valve member 19. With the lever in this position, the post 38 can be slipped over the shank 31 of the lever and the other parts of the regulator assembled. The post 38 thereby serves to hold the lever in such a position that projection 28 remains in slot 29 and serves to prevent relative rotation of the parts. Simultaneously, the curved projection 26 rides in the groove 27, the parts are so proportioned that their engagement serves as a fulcrum or pivot point between the lever and the valve body.

Thus, in the final position of the parts shown in Fig. 1, it can neither be axially disassembled or circumferentially displaced within the limits of operation of the rectangular diaphragm. The economy, simplicity, and light weight of this construction will be apparent to those skilled in the art, and the ease of assembly of the unit without the use of tools is such as to facilitate assembly of the valve by unskilled labor.

Figure 5:
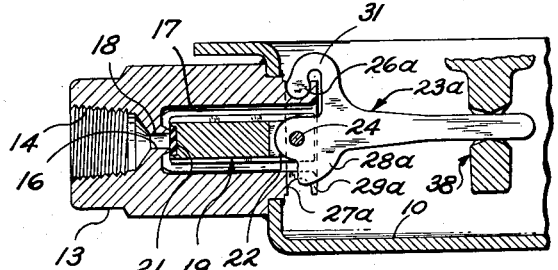

Referring to Fig. 5, a modified form of the invention is shown and is illustrated with a valve of the type in which the valve action is reversed with respect to the motion of the lever. As shown in Fig. 5 the mounting groove, instead of being an internal groove surrounding the bore 17, is formed as an external groove. In this construction a bellcrank lever 23a functions as described previously, but the pivoted end thereof is re-arranged except that the pivot 24 that connects the plunger 19 may be unaltered. In this form the semi-circular ear 26a is connected by a gooseneck 31 to the lever 23a. The groove 27a opens radially outwardly, as shown, and the circumferential valve-locating ear 28a rides with the valve in its assembled position in a slot 29a that intersects the groove 27a formed in the body member of the valve.

The assembly and operation of this form is like that of the preferred form in that the ear 26a is first inserted in the groove 29a and then the valve lever 23a is turned 180° to bring the ear 28a into position for insertion into the slot 29a. When the assembly is then assembled with the post 38 of the regulator, it cannot be detached or dislodged within the range of operation of the valve assembly. This construction requires a somewhat more complicated stamping for the valve member than does the preferred form shown in the other figures. The modes of operation of both constructions are substantially the same.

Having completed a detailed description of a preferred embodiment of the present invention so that others skilled in the art may be able to understand and practice the same, we state that what we desire to secure by Letters Patent is not limited by said preferred embodiment but rather is defined in what is claimed.

What is claimed is:

1. A poppet valve assembly comprising a valve body member having a passageway therein, a valve seat disposed within said passageway, an internal groove formed in said body providing axially spaced, annular walls axially spaced from said seat and opening radially into said passageway, said member having a substantially radial slot providing circumferentially spaced, substantially radial walls, a valve poppet reciprocable in said passageway for engaging said seat, a valve lever pivoted to said poppet having circumferentially spaced ear portions, one of said ear portions being positioned between and axially located by said spaced annular walls of said groove, the other ear portion extending between and being circumferentially located by said circumferentially spaced walls.

2. A poppet valve assembly comprising a valve body member having a bore therein, a valve seat disposed within said bore, an internal groove formed in said body providing axially spaced, annular walls outward of said seat and opening radially into said bore, said body having a substantially radial slot providing circumferentially spaced, substantially radial walls intersecting said groove, a valve poppet slidable in said bore for engaging said seat and a valve lever pivoted to said poppet, said lever having diametrically opposed ear portions, one of said ear portions being positioned between and axially located by said spaced annular walls of said groove, the other ear portion extending between and being circumferentially located by circumferentially spaced walls.

3. A poppet valve assembly comprising a valve body member having a bore therein, a valve seat disposed within said bore, an internal groove formed in said body providing axially spaced, annular walls axially outward of said seat and opening radially into said bore, said body having a substantially radial slot providing circumferentially spaced, substantially radial walls intersecting said groove, a valve poppet slidable in said bore for engaging said seat and a valve lever pivoted to said poppet, said lever having diametrically opposed ear portions, one of said ear portions being positioned between and axially located by the said spaced annular walls, the other ear portion extending between and being circumferentially located by said circumferentially spaced walls, said lever having an elongated shank generally parallel to the axis of said bore for engagement with a regulator diaphragm member.

4. A poppet valve assembly comprising a valve body member having a bore therein, a valve seat disposed within said bore, an internal groove formed in said body providing axially spaced, annular walls axially outward of said seat and opening radially into said bore, said body having a substantially radial slot providing circumferentially spaced, substantially radial walls intersecting said groove, a valve poppet slidable in said bore for engaging said seat, and a valve lever pivoted to said poppet, said lever having diametrically opposed ear portions, one of said ear portions being positioned between and axially located by said spaced annular walls of said groove, the other ear portion extending between and being circumferentially located by said circumferentially spaced walls, said other ear portion having an axially inner abutment surface disposed so as to prevent said lever from assuming the normal operating position with said one ear portion positioned between said axially spaced, annular walls and said surface engaging said body member axially outward of said groove and circumferentially spaced from said circumferentially spaced walls.

5. For use in a regulator having a pressure chamber partially bounded by spring-loaded diaphragm means, and inlet and outlet ports for said chamber, a poppet valve assembly for one of said ports comprising a body member having a fluid passageway therein, a valve seat disposed within said passageway, an internal groove formed in said body providing axially spaced, annular walls axially spaced from said seat and opening radially into said passageway, said member having a substantially radial slot providing circumferentially spaced, substantially radial walls intersecting said groove, a valve poppet reciprocable in said passageway for engaging said seat and a valve lever pivoted to said poppet, said lever having circumferentially spaced ear portions, one of said ear portions being positioned between and axially located by said spaced annular walls, the other ear portion extending between and being circumferentially located by said circumferentially spaced walls, said lever including an extension for actuation by said diaphragm means.

6. A poppet valve assembly comprising a valve body member having a passageway therein, a valve seat for controlling fluid flow through said pasageway, said member formed with an annular groove axially spaced from said seat and surrounding said passageway providing axially spaced, annular walls, said member having a substantially radial slot intersecting said groove and providing circumferentially spaced, substantially radial walls, a valve poppet having guide means reciprocable in said passageway and means for engaging said seat, and a valve lever pivoted to said poppet, said lever having circumferentially spaced ear portions, one of said ear portions being positioned between and axially located by said spaced annular walls, the other ear portion extending between and being circumferentially located by said circumferentially spaced walls.

7. A poppet valve assembly comprising a valve body member having a passageway therein, a valve seat for controlling fluid flow through said passageway, an external groove in said body axially spaced from said seat and opening radially outwardly around said passageway, a substantially radial slot in said member intersecting said groove, a valve poppet having guide means reciprocable in said passageway and means for engaging said seat, and a valve lever pivoted to said poppet, said lever having circumferentially-spaced ear portions, one of said ear portions being axially located by the walls of said groove, the other ear portion extending into and being circumferentially located by the walls of said slot.

8. A valve poppet assembly comprising a valve body member having a passageway therein, and a valve seat for controlling fluid flow through said passageway, an internal groove formed in said body providing axially spaced, annular walls axially spaced from said seat and opening radially into said passageway, said body having a substantially radial slot providing circumferentially spaced, substantially radial walls intersecting said groove, a valve poppet having guide means reciprocable in said passageway and means for engaging said seat, and a valve lever pivoted to said poppet, said lever having circumferentially spaced ear portions, one of said ear portions being positioned between and axially located by said spaced annular walls, the other ear portion extending between and being circumferentially located by circumferentially spaced walls.

9. A poppet valve assembly comprising a body member having an axially-extending passageway therein, a poppet axially slidable in said passageway, a lever for operating said poppet having circumferentially spaced ear portions, said body being recessed to provide axially spaced, substantially radial walls and being slotted to provide circumferentially spaced, substantially radial walls, one of said ear portions being positioned between and axially located by said spaced substantially radial walls, and the other of said ear portions being positioned between and circumferentially located by said circumferentially spaced walls.

10. A poppet valve assembly comprising a valve body having an axial passageway therein and a valve means composed of a valve member and an operating lever pivoted to said valve member, said body being recessed to provide axially spaced, substantially radial walls and axially slotted to provide circumferentially spaced, substantially radial walls, said lever having a circumferentially spaced ear portion positioned between and axially located by said spaced substantially radial walls, and said valve means having a circumferentially spaced ear portion positioned between and circumferentially located by said circumferentially spaced walls during the normal operational travel of said valving means.

WALTER C. GRAHLING.
THEODORE A. ST. CLAIR.

REFERENCES CITED

The following references are of record in the file of this patent:

UNITED STATES PATENTS

| Number | Name | Date |
| --- | --- | --- |
| 504,235 | Nicole | Aug. 29, 1893 |
| 666,383 | Hansen | Jan. 27, 1901 |
| 2,052,246 | Ray | Aug. 25, 1936 |